July 9, 1940.　　A. M. STONER　　2,207,231
DRILL SUPPORT
Filed Dec. 5, 1938
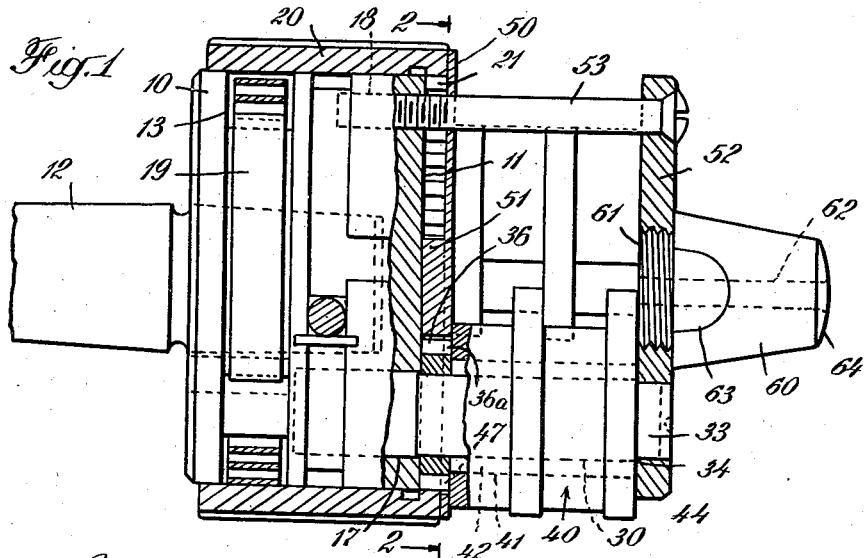
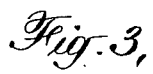
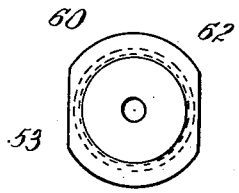
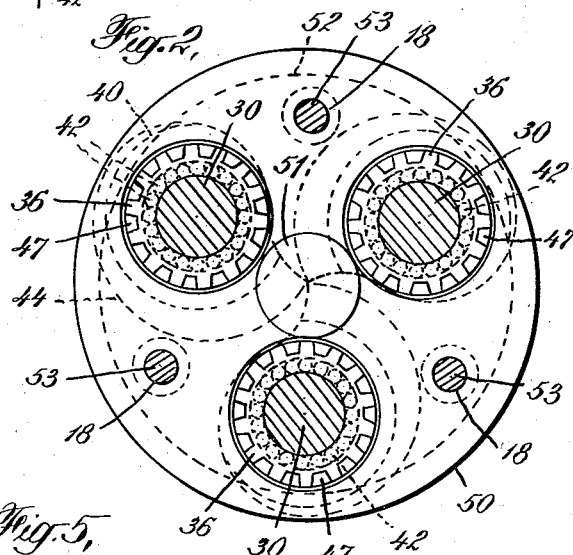
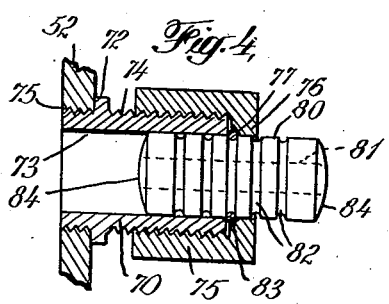
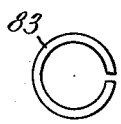
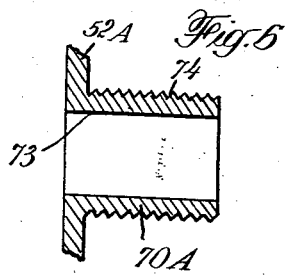
INVENTOR
Arthur M. Stoner
BY
Marshall & Stanley
ATTORNEYS Patented July 9, 1940

2,207,231

UNITED STATES PATENT OFFICE 2,207,231

DRILL SUPPORT

Arthur Merrick Stoner, West Hartford, Conn., assignor to The Jacobs Manufacturing Company, Hartford, Conn., a corporation of Connecticut Application December 5, 1938, Serial No. 243,999

5 Claims. (Cl. 279—33)

This invention relates to improvements in drill supports.

Its object is to provide a simple and inexpensive attachment for drill chucks to increase the utility of such chucks and to protect the drills. Drills, especially those of small diameter, are easily bent and broken and an object of this invention is to overcome this difficulty.

Another object is to provide an arrangement to preventing marring of the drilled material.

A still further object is to provide a device which is longitudinally adjustable in order to support properly drills of different lengths.

In the drawing,

Fig. 1 is a sectional side elevation of a chuck shown in my copending application for patent, Serial No. 218,111, filed July 8, 1938, with a drill support, which is also shown in said application, attached thereto, the latter being shown in elevation, (not sectioned);

Fig. 2 is a sectional end view of some of the parts shown in Fig. 1, the section being taken on the line 2—2 of the latter figure;

Fig. 3 is a front elevation of the drill support shown in Fig. 1;

Fig. 4 is a sectional side elevation of a modified form of drill support which includes a longitudinally adjustable bushing and means for holding it in a desired adjusted position;

Fig. 5 is an end elevation of a locking ring, one of the parts shown in Fig. 4; and Fig. 6 is a sectional side elevation of a modification in which a part of the chuck forms a part of the drill support.

The chuck shown in Figs. 1 and 2 comprises a substantially cylindrical body 10 having a transverse face 11. 12 is an arbor tapered to fit an axial hole in the body and adapted to fit the driven socket of a machine tool, such as a power drill. 13 is an annular groove near the rear end of the body in which is a spiral spring 19.

Three post holes 17 are drilled into the body from its outer face. These are equally spaced angularly and are at equal distances from the central axis of the body. Between them are tapped holes 18.

20 is a sleeve rotatably supported on the body 10. At its forward end is an internally toothed flange 21 which overlaps the outer face 11 of the body. The ends of the spring 19 are attached to the body 10 and to the sleeve to cause the sleeve to rotate on the body in a clockwise direction as viewed from the rear of the chuck (Fig. 2). It may be rotated in the opposite direction by hand, by the operator grasping the outer surface of the sleeve which is fluted as shown, to facilitate such operation.

Posts 30 are fitted into and seated upon the bottoms of the holes 17. The outer end 33 of each post is of reduced diameter and forms a shoulder 34.

Pinions 36 fit the posts 30 rotatively. These are in mesh with the teeth of the flange 21 of sleeve 20. They are of sufficient thickness to extend, when seated on the face 11 of body 10, beyond the flange 21, as shown at 36a in Fig. 1.

40 designates the clamping jaws. These have cylindrical bores 41 which fit the posts 30 with interposed rollers 42. Each jaw has a body with eccentric ribs 44. The contour of the ribs 44 is alike on all of the jaws, but they are spaced differently on each jaw, as shown in Fig. 1, so that their edges can be moved together to a common axis, as shown in Fig. 2.

From one end of each jaw, a row of crown teeth 47 concentric with the bores 41 projects. When assembled these teeth fit between the parts 36a of the pinion teeth which extend above the rim teeth 21, as shown in Figs. 1 and 2.

50 is a cover plate which is provided with clearance holes for the pinions 36 and the teeth 47. This lies on the front surface of the rim flange in the space between it and the lower ends of the body portions 43 of the clamping jaws.

52 is a clamping plate having perforations through which the ends 33 of the adjusting posts extend. This clamping plate rests on the shoulders 34 of the posts. It is held in place by screws 53 which pass through it and into engagement with the threaded holes 17 in the body 10.

The central bore of the clamping plate 52 is threaded to receive the boss 61 of a drill support 60 which projects forwardly from the clamping plate and has a central bore 62 to receive a drill. Its sides are flattened as at 63 to receive a wrench. The outer end of the support 60 is curved as shown at 64 in Fig. 1, so that it will not mar the surface of an object being drilled, if it comes in contact with such surface.

The bore 62 is but slightly larger than the drill with which the attachment is to be used and it is obvious that the device will support the part of the drill shank which is within it and effectively prevent that part of the shank from bending or from breaking from lateral pressures.

As it is desirable to support drills of different lengths, I have devised the adjustable arrangement shown in Figs. 4, 5 and 6. In these figures, 70 designates a housing having a threaded boss 71 which engages the threaded central bore of the clamping plate 52 and a flange 72 with flattened sides, (not shown), to receive a wrench. 73 is a cylindrical bore which extends through the length of the housing. The outside of the housing beyond the flange is threaded, as shown at 74.

80 is a cylindrical bushing which is slidable in the bore 73. 81 is a central drill supporting bore through the bushing. 82 designates a plurality of spaced shallow grooves around the bushing. In one of them is a split ring 83 of spring wire. The ends of the bushing are rounded, as shown at 84.

75 is the tubular body of a cap which is internally threaded to fit the bushing threads 74. 76 is the end of the cap. This has a central bore to fit the bushing 80 and has a beveled shoulder 77 which engages the wire ring 83 when the cap is screwed up tightly on the housing 70.

By this simple arrangement the ring is kept seated in one of the grooves and as it projects outwardly from the surface of the bushing, the latter is effectively locked to the housing.

By unscrewing the cap enough to release the engagement of its shoulder 77 with the ring, the bushing may be pushed into the housing as the ring is then free to expand and will be forced out of the groove in which it is seated. The resiliency of the ring will cause it to contract when the movement of the bushing brings it into alinement with the other grooves, into any one of which it may be locked by screwing up the cap 75.

The clamping plate of the chuck and the housing of the drill support may be made in one piece. Such a construction is shown in Fig. 6 in which 52A designates the part of such a piece which forms the clamping plate and 70A the part which forms the drill support housing.

Other structural modifications may be made within the spirit and scope of this invention and I intend no limitations other than those imposed by the appended claims.

This application is a continuation in part of my copending application Serial No. 218,111, filed July 8, 1938, to which reference has been made previously.

What I claim is:

1. A drill support comprising an externally threaded housing having a cylindrical bore, a bushing slidably fitting said housing and having an axial bore, and an internally threaded cap on the housing arranged to lock the bushing to the housing in different positions relative to the housing.

2. A drill support comprising an externally threaded housing having a cylindrical bore, a bushing slidably fitting said housing and having an axial bore, a plurality of spaced shallow grooves around the bushing, a resilient ring arranged to be seated in said grooves and to project from the external surface of the bushing, and an internally threaded cap on the housing having an internal surface arranged to hold the ring in one of the grooves.

3. A drill support comprising an externally threaded housing having a cylindrical bore, a bushing slidably fitting said housing and having an axial bore, a plurality of spaced shallow grooves around the bushing, a resilient ring arranged to be seated in said grooves and to project from the external surface of the bushing, and an internally threaded cap on the housing having an internal beveled edge arranged to engage the ring and hold it in one of the grooves.

4. A chuck comprising a body having a front plate constructed with a central threaded opening and a housing removably screwed into said opening, said housing having a clearance bore for a drill and projecting a fixed distance from said plate.

5. A chuck comprising a body having a front plate, a housing projecting from said plate, said housing having a cylindrical bore, means longitudinally adjustable in said bore arranged to support a drill laterally and to gauge the amount of projection of the drill, said means comprising a bushing having an outer cylindrical surface to fit the bore of the housing and a clearance hole for the drill, and means for locking the bushing in different adjusted positions.

ARTHUR MERRICK STONER.